(No Model.)
T. W. BROWN.
Animal Poke.
No. 230,860. Patented Aug. 10, 1880.
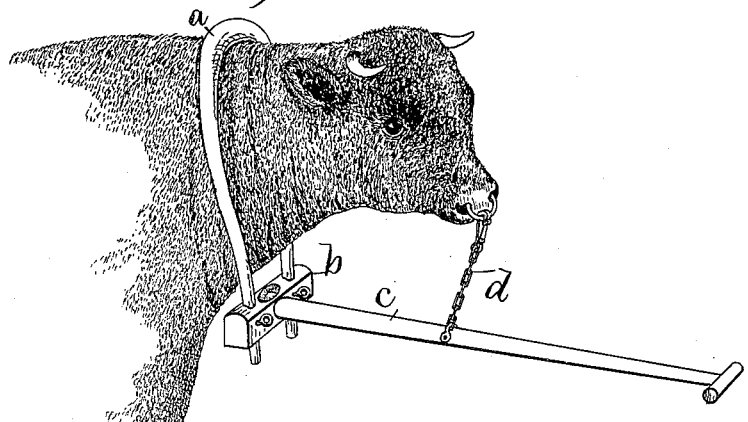
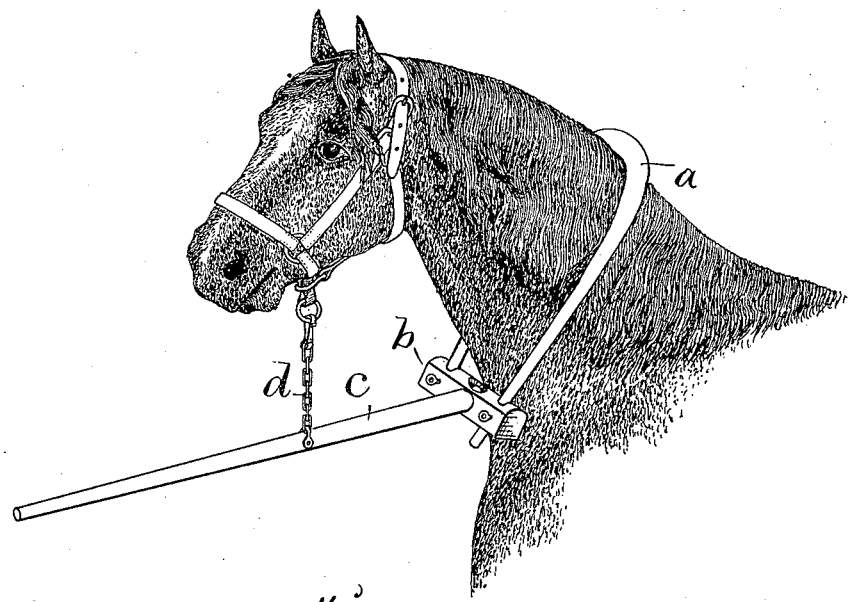
Witnesses:
R. G. Orwig.
Frank W. Heers.
Inventor:
Thomas W. Brown,
By Thomas G. Orwig, Atty.

UNITED STATES PATENT OFFICE.

THOMAS W. BROWN, OF SUMMERSET, IOWA.

ANIMAL-POKE.

SPECIFICATION forming part of Letters Patent No. 230,860, dated August 10, 1880.

Application filed June 17, 1880. (No model.)

*To all whom it may concern:*

Be it known that I, THOMAS W. BROWN, of Summerset, in the county of Warren and State of Iowa, have invented an Improved Animal-Poke, of which the following is a specification.

My invention relates to that class of devices that are adapted to be hung upon the necks of animals to prevent them from jumping over or breaking through fences.

Heretofore a pole has been connected with a yoke in various ways and in such a manner that the yoke would encircle the animal's neck and the pole would project from the yoke and the entire weight of the pole and complete poke press upon the animal's neck only. Poles have also been suspended from an animal's nose and extended rearward between the fore legs, to be connected with a belt that encircled the animal's body. Suspending the pole from the neck and one bearing only is objectionable, and passing the pole between the animal's legs to connect with a belt prevents longitudinal movement of the pole, and also restricts its lateral movements.

My improvement contemplates connecting a complete poke with an animal's nose and also with the animal's neck, to more completely control the animal's actions when free in a field, and also for the purpose of holding, leading, and governing the animal whenever desired.

It consists in combining a pole, a chain, and a yoke in such a manner that the chain can be readily attached to the animal's nose and the pole detached from the yoke on the animal's neck, as and for the purposes hereinafter fully set forth.

Figure 1 of my accompanying drawings is a perspective view, showing my improved animal-poke on a bull and connected with a ring in the bull's nose. Fig. 2 shows it on a horse and connected with his nose by means of a halter. Fig. 3 is a detail view, showing the detachable connection between the pole and the yoke.

Jointly considered, these figures clearly illustrate the construction, application, operation, and utility of my complete invention.

$a$ represents the bow of the yoke, and $b$ the cross-bar at the bottom of the bow and complete yoke. These pieces $a$ and $b$ are preferably made of hard wood. They may vary in size as desired, and be connected in any suitable way.

$c$ is a pole that is detachably connected with the cross-bar of the yoke by means of a mortise and tenon and a pin and key, as illustrated by Fig. 3, or in any suitable way. It is preferably made of hard wood, and may vary in size and weight as desired.

$d$ represents a short chain, flexible strap, cord, or rope, permanently attached to the pole $c$ by means of a staple, swivel, bolt, or in any suitable way.

$e$ represents a snap-hook or other suitable device fixed to the end of the chain $d$ in such a manner that it can be readily fastened to a ring in an animal's nose or to the halter on an animal's head.

In the practical use of my improved animal-poke the bow of the yoke is passed over an animal's neck and then fastened to the cross-bar. The detachable pole is then fastened to the cross-bar, and the end of the chain that is carried by the pole is connected with the ring in the animal's nose or the ring in the halter on the animal's head. The complete poke will be thus suspended from two bearings and operated by the movements of the animal's head and nose to conform its position relative to the position of the animal's body. When the animal's head and nose are down, as required in grazing in the field, the front and free end of the pole will rest upon the ground and the animal's nose and neck will be relieved from the weight of the pole to allow unrestricted movements to the animal's head, as required in eating off the ground. When the animal elevates its head, as required to jump over or break through a fence, the front end of the pole will be elevated accordingly to project forward to restrict the leaping and advance movement of the animal by pulling downward the animal's nose and by coming in contact with the fence and pushing the animal away.

Breeding in a herd of animals may be completely prevented, when desired, by thus placing my improved poke on the males.

When a vicious animal is to be led and handled I detach the rear end of the pole from the yoke and seize the front end of the pole to govern the movements of the animal and to keep the animal's teeth and horns from coming too close for comfort and safety.

I claim as my invention—

As an improved article of manufacture, an animal-poke composed of a yoke, $a\ b$, a detachable pole, $c$, and a chain, $d$, having a hook on its end, or otherwise adapted to be readily connected with a ring in or on an animal's nose, substantially as shown and described, for the purposes specified.

THOMAS W. BROWN.

Witnesses:
A. H. DYE,
W. T. HAMILTON.